(12) United States Patent
Byers

(10) Patent No.: US 10,178,151 B2
(45) Date of Patent: *Jan. 8, 2019

(54) SHARING ASSERTED MEDIA

(71) Applicant: AT&T Intellectual Property I, L.P., Atlanta, GA (US)

(72) Inventor: Simon D. Byers, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,349

(22) Filed: Oct. 26, 2015

(65) Prior Publication Data

US 2016/0057202 A1    Feb. 25, 2016

Related U.S. Application Data

(63) Continuation of application No. 13/617,861, filed on Sep. 14, 2012, now Pat. No. 9,171,015.

(51) Int. Cl.
*G06F 15/16* (2006.01)
*H04L 29/08* (2006.01)
(Continued)

(52) U.S. Cl.
CPC ........ *H04L 67/06* (2013.01); *G06F 17/30265* (2013.01); *G06Q 30/0601* (2013.01);
(Continued)

(58) Field of Classification Search
CPC ......... G06F 17/30265; G06F 17/30702; G06F 17/30047; G06F 17/20; G06F 17/30241;
(Continued)

(56) References Cited

U.S. PATENT DOCUMENTS 8,171,016 B2    5/2012  Van de Sluis et al.
8,296,808 B2   10/2012  Candelore et al.
(Continued)

OTHER PUBLICATIONS

Braga, Matt, "How to Use Metadata Magic for Better Flickr Photo Sharing," <http://www.tested.com/tech/photography/481-how-to-use-metadata-magic-for-better-flickr-photo-sharing/>, Jun. 24, 2010.
(Continued)

*Primary Examiner* — Jungwon Chang
(74) *Attorney, Agent, or Firm* — Hartman & Citrin LLC

(57) ABSTRACT

Concepts and technologies are disclosed herein for sharing asserted media. An assertion application can be executed by a device to generate asserted media. The assertion application can receive a request or other input for specifying information to be included in the asserted media. The assertion application also can be executed to obtain media captured with a media capture device and to obtain the information to be included in the asserted media. The assertion application also can associate the information with the media content to generate the asserted media and share the asserted media with one or more recipients. An assertion service remote from the user device can be configured to generate the asserted media and/or to share the asserted media with the recipients.

20 Claims, 9 Drawing Sheets

(51) Int. Cl.
*G06Q 30/06* (2012.01)
*G06F 17/30* (2006.01)
*G06T 7/70* (2017.01)

(52) U.S. Cl.
CPC .............. *H04L 67/02* (2013.01); *H04L 67/26* (2013.01); *G06F 17/30817* (2013.01); *G06T 7/70* (2017.01)

(58) Field of Classification Search
CPC . G06F 17/30817; H04L 67/025; H04L 67/02; H04L 67/12; H04L 67/06; H04L 67/26; G06Q 30/02; G06Q 10/00; G06Q 30/0601; H04N 1/00408; H04N 1/00127; H04N 1/00204; G06T 7/70
USPC ........... 709/204, 217, 218; 705/14.71, 26.61, 705/26.3; 345/633, 660; 340/855.1; 715/256; 707/758; 342/357.52; 358/474; 396/310
See application file for complete search history.

(56) References Cited

U.S. PATENT DOCUMENTS

| | | | |
|---|---|---|---|
| 8,862,737 | B2 | 10/2014 | Turski et al. |
| 9,171,015 | B2* | 10/2015 | Byers ................ G06F 17/30265 |
| 2008/0080789 | A1 | 4/2008 | Marks et al. |
| 2008/0204317 | A1* | 8/2008 | Schreve ............ G06F 17/30265 342/357.52 |
| 2008/0240702 | A1 | 10/2008 | Wassingbo et al. |
| 2008/0243861 | A1* | 10/2008 | Wassingbo ........ G06F 17/30047 |
| 2008/0297608 | A1 | 12/2008 | Border et al. |
| 2009/0100106 | A1 | 4/2009 | Anthony et al. |
| 2009/0144321 | A1 | 6/2009 | Shamma |
| 2009/0190189 | A1* | 7/2009 | Suga .................. H04N 1/00127 358/474 |
| 2009/0222482 | A1* | 9/2009 | Klassen ............ G06F 17/30241 |
| 2010/0279666 | A1 | 11/2010 | Small et al. |
| 2011/0025715 | A1* | 2/2011 | Uchida .............. H04N 1/00408 345/660 |
| 2011/0066588 | A1* | 3/2011 | Xie .......................... G06N 5/02 706/58 |
| 2011/0202582 | A1 | 8/2011 | Kim et al. |
| 2011/0246874 | A1* | 10/2011 | Sathish ............. G06F 17/30702 715/256 |
| 2012/0086727 | A1* | 4/2012 | Korah ................... G06T 19/006 345/633 |
| 2012/0101912 | A1* | 4/2012 | Sen ......................... H04L 67/12 705/26.3 |
| 2012/0226752 | A1* | 9/2012 | Jeong ..................... H04L 67/02 709/204 |
| 2012/0233000 | A1* | 9/2012 | Fisher ................... G06Q 30/02 705/14.71 |
| 2012/0233025 | A1* | 9/2012 | Calman .................. G06Q 10/00 705/26.61 |
| 2013/0007192 | A1* | 1/2013 | Schmidt ............... H04L 67/025 709/217 |
| 2013/0054629 | A1* | 2/2013 | Takami ............. G06F 17/30265 707/758 |
| 2013/0121678 | A1* | 5/2013 | Xin ........................ G03B 17/24 396/310 |
| 2013/0191507 | A1* | 7/2013 | Tuukkanen ........ H04N 1/00204 709/217 |
| 2014/0300485 | A1* | 10/2014 | Baugh .................... E21B 47/01 340/855.1 |
| 2017/0366488 | A1* | 12/2017 | Pedregal ................. G06F 17/20 |

OTHER PUBLICATIONS

U.S. Office Action dated Oct. 22, 2014, in U.S. Appl. No. 13/617,861.
U.S. Notice of Allowance dated May 20, 2015 in U.S. Appl. No. 13/617,861.

* cited by examiner

SHARING ASSERTED MEDIA

CROSS-REFERENCE TO RELATED APPLICATIONS

This application is a continuation of, and claims priority to U.S. patent application Ser. No. 13/617,861, entitled "Sharing Asserted Media," filed Sep. 14, 2012, now U.S. Pat. No. 9,171,015, which is incorporated herein by reference in its entirety.

BACKGROUND

This application relates generally to media sharing. More specifically, the disclosure provided herein relates to sharing asserted media.

Over the past several years, the use of various mobile computing device platforms has proliferated. Mobile computing devices have become popular platforms for executing various types of functionality that previously may have been completed with a computer or other device. As such, an increasing number of functions that traditionally may have been completed by way of various computing devices or other devices may now be completed with a mobile computing device such as a slate computer, a tablet computer, a mobile telephone, a smartphone, or the like.

For example, many modern mobile computing devices may include cameras and/or various application programs for capturing and sharing media such as photographs, videos, and/or audio files. Thus, users may be able to capture media at almost any location and share that media with various entities. Because these mobile computing devices can be taken almost anywhere and because these mobile computing devices often include advanced software for editing and/or altering media, media captured and/or shared by users of the mobile computing devices may be altered by users and/or may be taken at almost any location.

SUMMARY

The present disclosure is directed to sharing asserted media. According to concepts and technologies disclosed herein, media content can be captured by a device such as a user device. The media can be captured via various media capture devices of the user device and/or accessible by the user device. The media capture devices can include, for example, one or more cameras, microphones, or the like. The user device can be configured to execute an assertion application that can be executed by the user device to generate asserted media. As used herein, the term "asserted media" and/or variants thereof can be used to refer to media content or other content that includes, is embedded with, and/or is otherwise associated with various types of information that can be used to validate the media content. Thus, media content that is represented as being an authentic representation of a particular product, place, or other subject can include information usable for validating (or refuting) any such representation.

The assertion application can be executed by the user device to determine what types of information are to be included with the media content to generate asserted media. In some embodiments, the assertion application can receive a request that specifies the information to be included, while in some other embodiments, the assertion application can present various user interfaces ("UIs") via which users can specify the information to be included. Thus, media content can be supplemented by various types of information such as location information, device orientation information, sensor readings, time, date, network connectivity information, text information, and/or other information that can be used to validate a representation made with respect to the media.

The assertion application also can be executed by the user device to capture or instruct other hardware and/or software of the user device to capture the information to be included in the asserted media. The assertion application also can be configured to embed, attach, and/or otherwise associate the information with the media content to generate the asserted media. In some embodiments of the concepts and technologies disclosed herein, the user device can be configured to transmit the asserted media to a recipient or other entity via various types of communication connections. In some other embodiments, the user device can be configured to transmit the media content and/or the information to be embedded in the asserted media to an assertion service executed by another device such as a server computer. The assertion service can be configured to generate the asserted media and/or to share the asserted media with one or more recipients.

According to one aspect of the concepts and technologies disclosed herein, a method is disclosed. The method can include obtaining, at a server computer executing an assertion service, media content and a sensor reading from a user device. The method also can include generating asserted media by associating the sensor reading with the media content. The method also can include sharing the asserted media with a recipient.

In some embodiments, the method also can include receiving, from the recipient, a request for the asserted media, and sending an instruction to the user device to obtain the sensor reading and the media content. In some embodiments, the method also can include generating an asserted media identifier, sending the asserted media identifier to the user device with the instruction, and receiving, with the media content and the sensor information, the asserted media identifier. The method also can include receiving, with the sensor reading and the media content, other information from the user device, and associating the other information with the sensor reading and the media content. According to some embodiments, the media content can include a photograph, the sensor reading can include an orientation of the user device, and the other information can include location information indicating a geographic location of the user device at a time at which the photograph is taken. In some embodiments, the recipient includes a user of the assertion service and the user device can be associated with a customer of the user. In some embodiments, the user device can be configured to execute an assertion application for providing the media content and the sensor reading.

According to another aspect of the concepts and technologies disclosed herein, a computer storage medium is disclosed. The computer storage medium can have computer-executable instructions stored thereon that, when executed by a computer, cause the computer to launch an assertion application at the computer. The instructions also can be executed by the computer to cause the computer to obtain information to be included in asserted media, the information including a sensor reading and other information, and to capture media content. The instructions also can be executed by the computer to cause the computer to associate the sensor reading and the other information with the media content to generate the asserted media, and share the asserted media with a recipient.

In some embodiments, the computer storage medium can further include computer-executable instructions that, when executed by the computer, cause the computer to receive, from an assertion service, a request for the asserted media, and identify, based at least partially upon the request, the information to be included in the asserted media. The instructions also can be executed by the computer to cause the computer to present a user interface for specifying the sensor reading and the other information, and receive input via the user interface, the input specifying the sensor reading and the other information. In some embodiments, the computer-executable instructions can, when executed by the computer, cause the computer to present a user interface having a first user interface control for capturing the media content and a second user interface control for specifying the sensor reading and the other information.

According to various embodiments of the concepts and technologies disclosed herein, the computer-executable instructions also can cause the computer to associate the sensor reading and the other information with the media content by transmitting, to an assertion service, the media content, the sensor reading, and the other information, and wherein the assertion service can be configured to generate the asserted media. According to some embodiments, the other information can include an asserted media identifier received from an assertion service in communication with the computer.

According to yet another aspect, a server computer is disclosed. The mobile server computer can include a processor configured to execute computer-executable instructions stored thereon for providing an assertion service, wherein the processor is configured, via execution of the assertion service, to obtain media content, a sensor reading, and other information from a user device. The processor also can be configured to generate asserted media by associating the sensor reading and the other information with the media content. The processor also can be configured to share the asserted media with a recipient.

In some embodiments, the processor can be further configured to execute the assertion service to receive a request for the asserted media, and to send an instruction to the user device for requesting the sensor reading, the other information, and the media content. The processor also can be further configured to execute the assertion service to generate an asserted media identifier, to send the asserted media identifier to the user device, and to obtain with the media content, the sensor reading, and the other information, the asserted media identifier.

According to various embodiments, associating the sensor reading and the other information with the media content can include embedding, in the media content, data specifying the sensor reading and the other information. The request for the asserted media can be received from a user of the assertion service. In some embodiments, the user includes a product manufacturer, and the user device can be associated with a customer of the product manufacturer. In some embodiments, the sensor reading can include an orientation of the user device, and the other information can include a geographic location of the user device at a time at which the media content is captured at the user device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to sharing asserted media. According to concepts and technologies disclosed herein, media content can be captured by a device using various media capture devices such as, for example, cameras, microphones, or the like. The device also can be configured to execute an assertion application. The assertion application can be executed by the device to determine what types of information are to be included with the media content to generate asserted media. As used herein, the term "asserted media" and/or variants thereof can be used to refer to media or other content that includes, is embedded with, and/or is otherwise associated with various types of information that can be used to validate the media content. For example, a photograph can be supplemented by information such as location information, device orientation information, or other information to determine if a photograph is authentic or unauthentic. The various types of information that can be used to supplement the media content and/or how such information can be used to authenticate media will be described in additional detail herein.

According to various embodiments, the assertion application can be executed by the device to capture or request the information to be included in the asserted media, and to embed the information in the media content to generate the asserted media. In some implementations, the asserted media can be transmitted by the device to a recipient or other entity via various types of communication connections. In some other embodiments, the device can be configured to transmit the media content and/or the information to be embedded in the asserted media to an assertion service executed by another device such as a server computer. The assertion service can be executed by the server computer to combine the media content and the information to generate the asserted media and can share the asserted media with the recipient.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
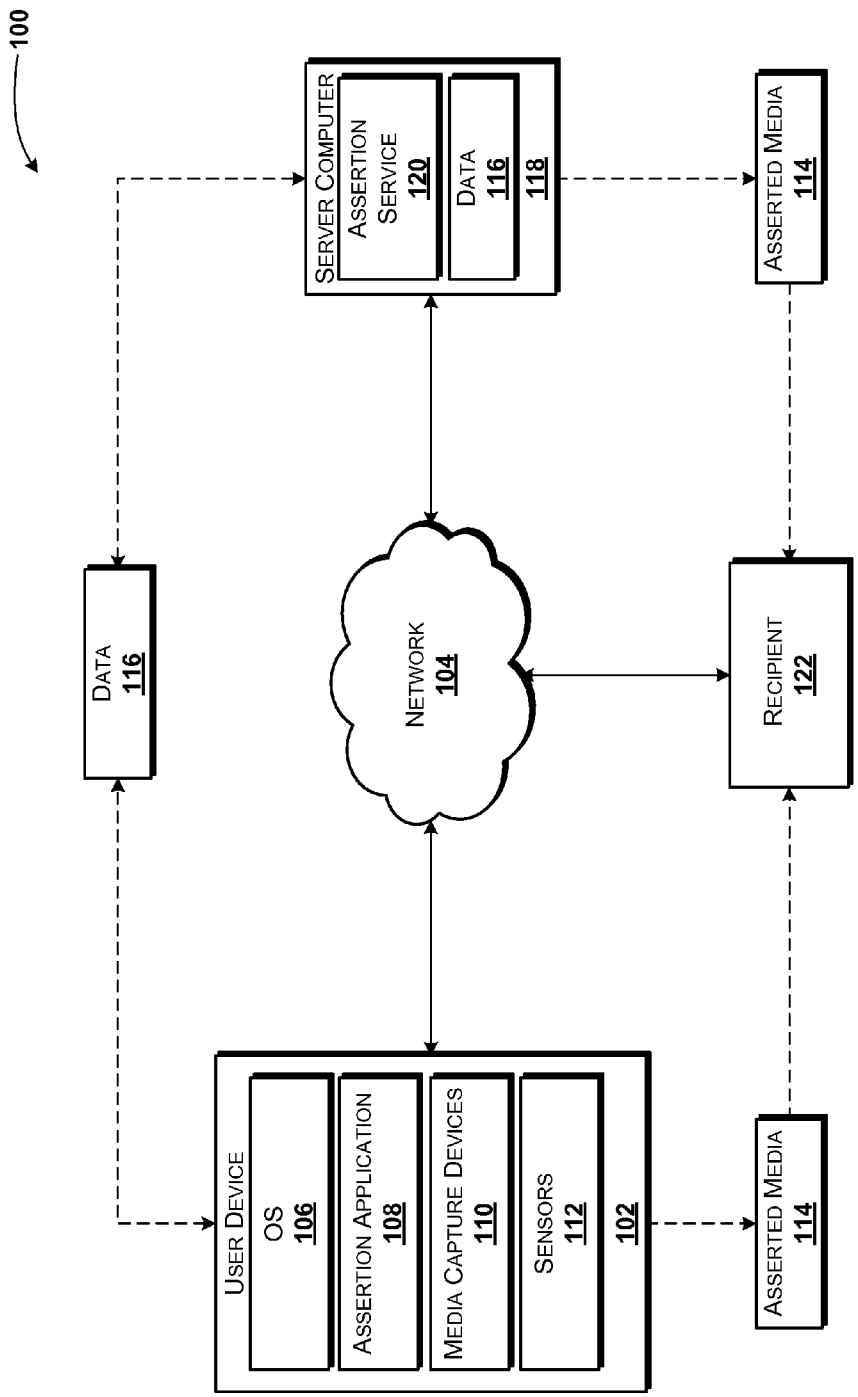
FIG. 1 is a system diagram illustrating an illustrative operating environment for the various embodiments disclosed herein.

Referring now to FIG. 1, aspects of an operating environment 100 for various embodiments of the concepts and technologies disclosed herein for sharing asserted media will be described, according to an illustrative embodiment. The operating environment 100 shown in FIG. 1 includes a user device 102 operating in communication with and/or as a part of a communications network ("network") 104. It should be understood that the user device 102 may be configured to operate without communicating with the network 104 at various times and/or under various operating conditions. As such, the illustrated embodiment should be understood as being illustrative of some contemplated operating conditions and should not be construed as being limiting in any way.

According to various embodiments, the functionality of the user device 102 may be provided by one or more mobile telephones, laptop computers, tablet computers, slate computers, media devices, digital imaging devices, or the like. In some other embodiments, the functionality of the user device 102 can be provided by one or more desktop computers, server computers, set-top boxes ("STBs"), embedded computer systems, other computing systems, and the like. It should be understood that the functionality of the user device 102 described herein can be provided by a single device executing a local or remote application, or by two or more devices. For purposes of describing the concepts and technologies disclosed herein, the user device 102 is described herein as a mobile computing device such as a smartphone or tablet computer. It should be understood that this embodiment is illustrative, and should not be construed as being limiting in any way.

The user device 102 can execute an operating system 106, an assertion application 108, and/or other application programs. The operating system 106 is a computer program for controlling the operation of the user device 102. The assertion application 108 can include one or more executable programs configured to execute on top of the operating system 106 to provide the functionality described herein for sharing asserted media. The application programs can include various web-based and/or natively executed software applications and/or modules such as, for example, media capture application such as imaging applications, audio capture application, or video capture applications; text, email, and/or other messaging applications; social networking applications; telephone applications; map applications; productivity applications; gaming software; combinations thereof; or the like.

According to various embodiments, the assertion application 108 can be configured to interact with one or more of the application programs, for example one or more media capture application, to provide the functionality described herein for sharing asserted media, though this is not necessarily the case. While the assertion application 108 is illustrated as being located at the user device 102, it should be understood that the assertion application 108 and/or the application programs can include natively executed applications, web applications, and/or hybrid applications (wherein some functionality is provided by a locally executed application that can access remotely provided data). As such, it should be understood that the illustrated embodiment is illustrative, and should not be construed as being limiting in any way.

The assertion application 108 can be configured to capture, or request that other application programs capture, various types of media content and/or sensor readings at the user device 102. The assertion application 108 also can be configured to submit the media content and/or sensor readings together or separately to other users, devices, networks, applications, or the like, as will be described in more detail below. According to various embodiments of the concepts and technologies disclosed herein, the assertion application 108 can be configured to access one or more media capture devices 110 such as, for example, one or more microphones, decibel meters, and/or other noise sensors; cameras and/or other imaging devices; or the like. Thus, the assertion application 108 can be configured to capture photos, videos, sound, and/or noise using one or more of the media capture devices 110. Of course, it should be understood that the user device 102 can execute one or more application programs as noted above for converting raw image, sound, video, or other media content into media files. As such, it should be understood that media content may be captured by the user device 102 as media content and/or captured by the user device 102 as raw data and converted by the user device 102 into the media content.

The assertion application 108 also can be configured to access various sensors 112. The sensors 112 can include, but are not limited to, ambient light sensors; accelerometers, gyroscopes, magnetometers, and/or other orientation sensors; GPS receivers and/or other location detection devices; long-range and/or short-range wireless transceivers; temperature sensors; radio frequency identification ("RFID") sensors, near field communications ("NFC") sensors, and/or other wireless resonance technology devices; and/or other sensors. As such, the assertion application 108 can be configured to access one or more of the sensors 112 to determine and/or capture light levels; noise levels; images; sounds; absolute and/or relative location information; orientation information; speed, direction, and/or trajectory information; network information; combinations thereof; or the like. Because any sensors of or accessible by the user device 102 can be used to obtain sensor readings in accordance with the concepts and technologies disclosed herein, it should be understood that the above examples of sensor readings are illustrative and should not be construed as being limiting in any way.

The assertion application 108 also can be configured to capture or specify other information such as, for example, time and date information; user information such as email addresses, telephone numbers, account numbers, names, an International Mobile Subscriber Identity ("IMSI"), or the like; device information such as a serial number, a model number, a unique identifier, an International Mobile Equipment Identity ("IMEI"), or the like; calendar information such as appointments and/or events; messaging information; or the like. The user device 102 also can be configured to access and/or collect location information. In particular, the user device 102 can collect location information using, for example, global positioning system ("GPS") devices; location beacons; radio receivers, transmitters, and/or transceivers; cellular network locating devices; combinations thereof, or the like. The above list is not exhaustive and it should be understood that any technology for locating the user device 102 can be used to provide location information. As such, the above examples of other information should be understood as being illustrative, and should not be construed as being limiting in any way.

As will be described in more detail below, particularly with reference to FIGS. 2-4D, the assertion application 108 can be configured to obtain the media content captured by the user device 102, the sensor readings captured by the sensors 112, and/or the other information. The assertion application 108 can be configured to append, embed, attach, and/or otherwise associate the sensor readings and/or other information with the captured media content to generate asserted media 114. Thus, the asserted media 114 can include media content captured by the user device 102 and one or more of the sensor readings and/or other information included as embedded data, a data file attached to the media content, header information, metadata, and/or other data associated with the media content. Because the sensor information and/or the other information can be associated with the media content in various ways, it should be understood that these embodiments are illustrative, and should not be construed as being limiting in any way.

In some other embodiments of the concepts and technologies disclosed herein, the assertion application 108 can be configured to obtain the media content, the sensor readings, and/or the other information, and to transmit these data to another entity as data 116. In the embodiment illustrated in FIG. 1, the user device 102 is illustrated as transmitting the data 116 to a server computer 118, which can be configured to host or execute an assertion service 120. The assertion service 120 can be configured to combine the media content, the sensor readings, and/or the other information included in the data 116 to generate the asserted media 114 described herein. As such, it should be understood that the functionality described herein for generating the asserted media 114 can be provided by the user device 102 and/or the assertion service 120.

The asserted media 114 can be shared with, transmitted to, and/or otherwise provided to a recipient 122 by the user device 102 and/or the server computer 118. As noted above, the asserted media 114 received by the recipient 122 can include the media content captured at the user device 102, as well as the sensor readings and/or other information captured at or provided by the user device 102. As such, the asserted media 114 can provide various types of information in addition to media content. In particular, asserted media 114 as disclosed herein can include media content and information indicating, for example, geographic location; bearing; trajectory; speed; orientation; sound levels; light levels; nearby networks, devices, or users; other information such as reference numbers, customer or account numbers, or the like; and/or other types of information. As such, the asserted media 114 described herein can be used to increase reliability of some types of media content.

The recipient can analyze the asserted media 114 to subjectively and/or objectively determine if one or more representations made with respect to the media content are validated or refuted by the asserted media 114. For example, if a user is asked to submit asserted media 114 to prove he or she is in a particular location, the recipient 122 may receive the asserted media 114 that includes a photo of the particular location, as well as location information and/or device orientation information obtained from the user device 102. Thus, the recipient 122 may validate the location based upon the contents of the photo, as well as the location and/or other information included in the asserted media 114. Additional uses of the asserted media 114 are described below in more detail.

The assertion application 108 can be configured to present various user interfaces for interacting with the assertion application 108. Some examples of contemplated user interfaces for controlling the assertion application 108 are illustrated and described below with reference to FIGS. 4A-4D. It should be understood that these embodiments are illustrative, and should not be construed as being limiting in any way.

In operation, the user device 102 can be configured to capture media content via various media capture devices 110 of the user device 102 and/or accessible by the user device 102. The media captured by the user device 102 can include photographs, videos, audio, or the like. The user device 102 can be configured to execute the assertion application 108 to generate the asserted media 114 described herein using the media content as well as sensor readings and/or other information obtained at the user device 102. Thus, a user or other entity associated with the user device 102 may represent media content as being an authentic representation of a particular product, place, or other subject, and can submit asserted media 114 to one or more recipients such as the recipient 122 to validate or refute such a representation.

The assertion application 108 can be executed by the user device 102 to determine what types of information are to be included with the media content to generate the asserted media 114. In some embodiments, the assertion application 108 can receive a request from various entities including, but not limited to, the assertion service 120. The request can be received as the data 116 and can specify the information to be included in the asserted media 114. In some other embodiments, the assertion application 108 can be configured to present various UIs via which users or other entities can specify the information to be included in the asserted media 114. Thus, the assertion application 108 can be configured to supplement media content with various types of information.

The assertion application 108 also can be executed by the user device 102 to capture or instruct other hardware and/or software of the user device 102 to capture the information to be included in the asserted media 114. The assertion application 108 also can be configured to embed, attach, and/or otherwise associate the information with the media content to generate the asserted media 114. In some embodiments, the user device 102 can be configured to transmit the asserted media 114 to a recipient or other entity via various types of communication connections. In some other embodiments, the user device 102 can be configured to transmit the media content and/or the information to be embedded in the asserted media 114 to the assertion service 120 as the data 116. The assertion service 120 can generate the asserted media 114 and/or share the asserted media 114 with one or more recipients such as the recipient 122. These and other aspects of the concepts and technologies disclosed herein will be described in more detail below at least with reference to FIGS. 2-6.

FIG. 1 illustrates one user device 102, one network 104, one server computer 118, and one recipient 122. It should be understood, however, that various implementations of the operating environment 100 include multiple user devices 102, multiple networks 104, multiple server computers 118, and/or multiple recipients 122. As such, the illustrated embodiment should be understood as being illustrative, and should not be construed as being limiting in any way.

Figure 2:
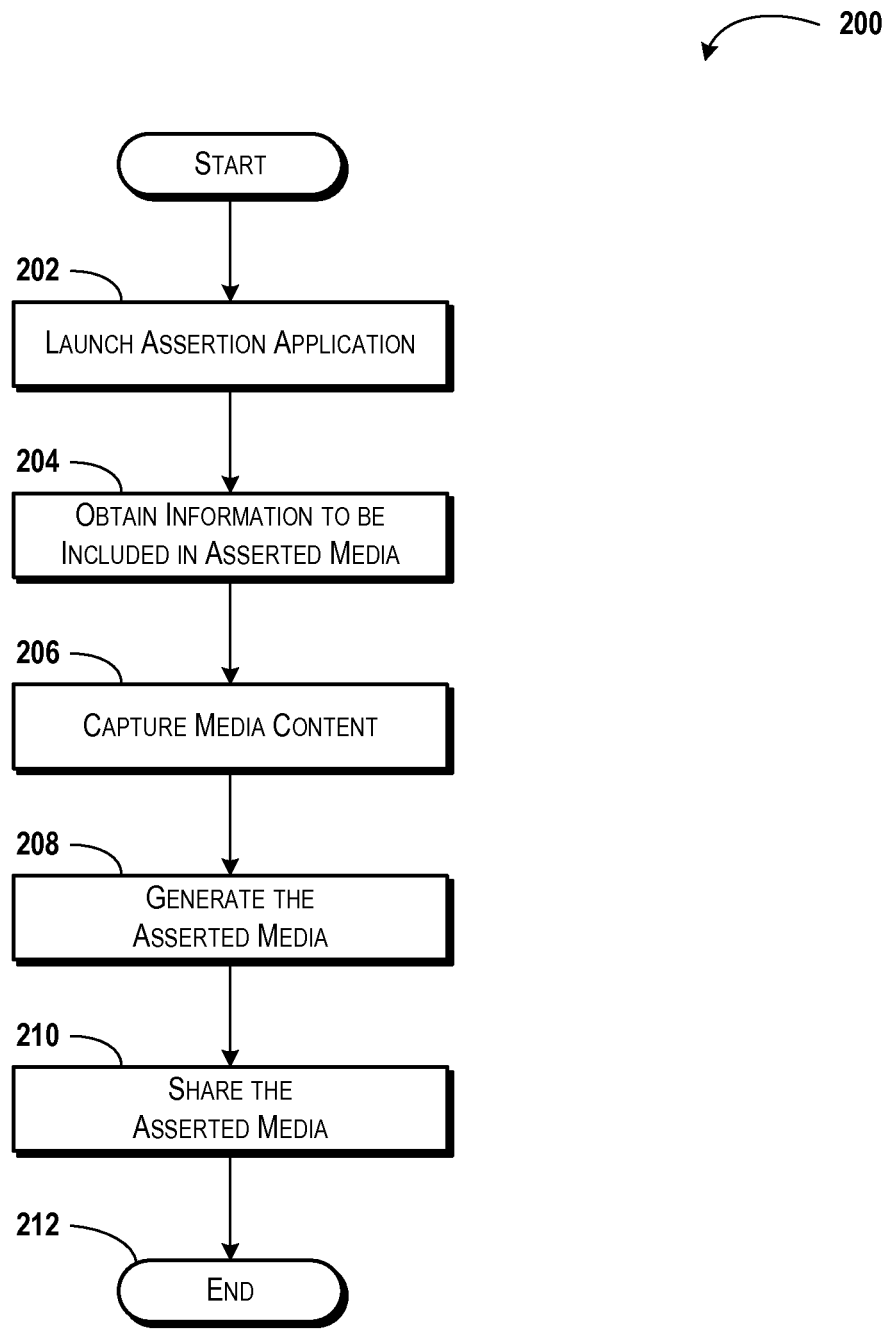
FIG. 2 is a flow diagram showing aspects of a method for managing application access settings, according to an illustrative embodiment.

Turning now to FIG. 2, aspects of a method 200 for sharing asserted media 114 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used in the herein, is used expansively hereinto include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof.

For purposes of illustrating and describing the concepts of the present disclosure, the method 200 is described as being performed by the user device 102 via execution of one or more software modules such as, for example, the assertion application 108. It should be understood that additional and/or alternative devices and/or network nodes can provide the functionality described herein via execution of one or more modules, applications, and/or other software including, but not limited to, the assertion application 108. Thus, the illustrated embodiment of the method 200 should be understood as being illustrative of one contemplated embodiment, and should not be viewed as being limiting in any way.

The method 200 begins at operation 202, wherein the user device 102 launches the assertion application 108. According to various embodiments, the user device 102 can launch the assertion application 108 and/or access functionality associated with the assertion application 108 via a menu option, an application icon, a voice command, keystroke, or other input, and/or via links or other embedded instructions in a web page, email, text message, or the like. In yet other embodiments, the assertion application 108 can be launched by the user device 102 from within a media capture application such as a camera application. Because the functionality described herein with respect to the assertion application 108 can be accessed at various times and/or in response to various activities, it should be understood that these embodiments are illustrative, and should not be construed as being limiting in any way.

From operation 202, the method 200 proceeds to operation 204, wherein the user device 102 obtains information to be included in the asserted media 114. As explained above, the user device 102 and/or the assertion application 108 can be configured to identify and/or receive specification of the various sensor readings and/or other information that are to be included in the asserted media 114 via presentation of one or more UIs at the user device 102. Additionally, or alternatively, the user device 102 can be configured to receive a request for the asserted media 114, wherein the request can identify what information is to be included in the asserted media 114. As such, although not illustrated in FIG. 2, it should be understood that the user device 102 can receive and/or analyze a request for the asserted media to identify what information is to be obtained by the assertion application 108.

In operation 204, the user device 102 can access the identified hardware and/or software to obtain the information that is to be included in the asserted media 114. Thus, the user device 102 can be configured to access one or more of the sensors 112 to obtain various sensor readings and/or other information. In particular, in various embodiments the user device 102 can be configured to collect the sensor information by accessing various onboard and/or remote sensors such as, for example, accelerometers, gyroscopes, magnetometers/compasses, and/or other orientation sensors; light sensors; proximity sensors; temperature sensors; air quality, smoke, fire, and/or chemical sensors; biometric devices; microphones, decibel meters, and/or other sound sensors; cameras and/or other optical devices or detectors; infrared sensors; and/or other sensors or devices of the user device 102 and/or in communication with the user device 102. In operation 204, the user device 102 also can be configured to collect other information that, while not technically being "sensor information," may be obtained from various hardware and/or software at the user device 102.

Thus, the user device 102 also can be configured to obtain other device information and/or user information such as, for example, time and date information; an IMSI, an IMEI, a telephone number, an email address, a device serial number, an account number, and/or other user or device identification information; calendar information such as appointments and/or events; messaging information; or the like. The user device 102 also can be configured to access and/or collect location information. In particular, the user device 102 can collect location information using, for example, GPS devices; location beacons; radio receivers, transmitters, and/or transceivers; cellular network locating devices; combinations thereof, or the like. The above list is not exhaustive and it should be understood that any technology for locating the user device 102 can be used to provide location information accurate to various levels of granularity such as, for example, hundreds of meters, tens of meters, meters, and/or portions of meters. As such, the above examples of location determination devices should be understood as being illustrative, and should not be construed as being limiting in any way.

From operation 204, the method 200 proceeds to operation 206, wherein the user device 102 captures media content. According to various embodiments, the user device 102 can be configured to launch a media capture application and/or to access one or more of the media capture devices 110 to capture the media content. In one contemplated embodiment, the assertion application 108 can capture, via the media capture devices 110, various images and/or audio files as raw data, and can be configured to generate the media content by converting the raw data into a recognized or proprietary media format. Thus, while not separately shown in FIG. 2, it should be understood that the user device 102 can be configured to generate the media content via one or more operations at the user device 102 or elsewhere.

From operation 206, the method 200 proceeds to operation 208, wherein the user device 102 generates the asserted media 114. In particular, the user device 102 can be configured to combine, embed, and/or associate the sensor readings and/or other information obtained in operation 204 with the media content captured in operation 206. According to various embodiments, some of which are illustrated and described in more detail below with reference to FIGS. 4A-4D, a user and/or other entity can select and/or deselect via one or more UIs what sensor readings and/or other information are to be included in the asserted media 114.

In some other embodiments, the assertion application 108 can be configured to obtain and/or embed specific sensor readings and/or other information with the captured media without user interaction. The determination, by the assertion application 108, as to what sensor readings and/or other information are to be included in the asserted media 114 can be based, at least partially, upon device settings, user settings, configurations, application settings, requests for the asserted media 114, and/or other considerations. In one contemplated embodiment, a recipient 122 such as, for example, a product retailer or product manufacturer can generate a request for the asserted media 114 via the assertion service 120. The request for the asserted media 114 can specify what sensor readings and/or other information are to be included in the asserted media 114. The assertion service 120 can forward the request and/or generate a new request that can be transmitted to the user device 102 as the data 116. Thus, the data 116 can identify the sensor readings and/or other information to include in the asserted media 114, in some embodiments.

In one contemplated example of the concepts and technologies described herein, a product manufacturer may receive a warranty request from a consumer regarding a product manufactured by the product manufacturer. Because shipping and/or handling the product may be expensive and/or cumbersome, some product manufacturers may be interested in obtaining a photograph of the product from the consumer as proof that the consumer possesses and/or owns the product in question, without requiring shipping of the allegedly defective product. To prevent the consumer from taking a photograph of others' product and/or using a photograph of the product from the Web to wrongfully take advantage of such a warranty process, the product manufacturer may use the asserted media 114 described herein.

In particular, the product manufacturer may access the assertion service 120 and/or other functionality for generating a request for the asserted media 114. The request can be sent directly to the user device 102 and/or forwarded to the user device 102 via the assertion service 120 or other hardware and/or software. The request for the asserted media 114 can be forward to the user device 102 as the data 116 described above with reference to FIG. 1 and can specify, for example, a number and/or type of media (such as photos, videos, sound files, etc.) requested, instructions for capturing the media such as indications specifying particular views of the product that should be represented by the asserted media 114, reference numbers, asserted media identifier ("asserted media IDs"), or the like. Thus, it can be appreciated that the determination, by the user device 102, as to what information to include in the asserted media 114 may be made based upon a request for the asserted media 114. It should be understood that this embodiment is illustrative, and should not be construed as being limiting in any way.

From operation 208, the method 200 proceeds to operation 210, wherein the user device 102 shares the asserted media 114. According to some embodiments, the user device 102 can be configured to transfer the asserted media 114 to the recipient 122 as an email attachment, as a data file, and/or as another type of data via almost any type of network transfer technology. Because the asserted media 114 can be shared with the recipient 122 via almost any type of wired and/or wired networks, and via almost any type of data transfer protocols, it should be understood that the embodiments illustrated and described herein are illustrative, and should not be construed as being limiting in any way.

In some embodiments of the concepts and technologies described herein, the functionality of the user device 102 described herein with reference to operations 204-210 can be performed by the assertion service 120 and/or other services and/or devices, if desired. Thus, the user device 102 can be configured to transmit and/or upload the sensor readings and/or other information obtained in operation 204 and/or the media content captured in operation 206 to the assertion service 120 and/or the other devices and/or services. The assertion service 120 and/or the other devices and/or services can be configured to generate and share the asserted media 114 with one or more recipients. As such, the above embodiment illustrated and described with respect to FIG. 2 should be understood as being illustrative and should not be construed as being limiting in any way. From operation 210, the method 200 proceeds to operation 212. The method 200 ends at operation 212.

Figure 3:
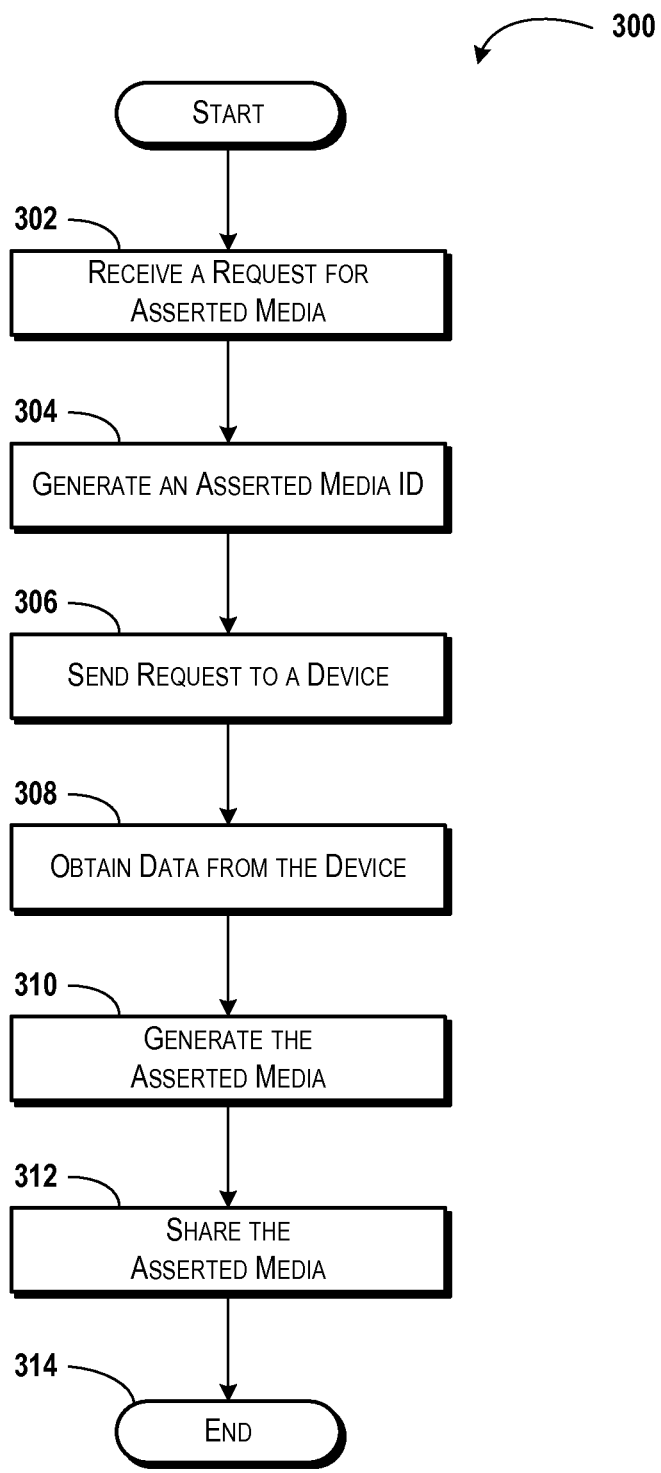
FIG. 3 is a flow diagram showing aspects of a method for managing application access settings, according to another illustrative embodiment.

Turning now to FIG. 3, aspects of a method 300 for sharing asserted media 114 will be described in detail, according to another illustrative embodiment. For purposes of illustrating and describing the concepts of the present disclosure, the method 300 is described as being performed by the server computer 118 via execution of one or more applications, programs, and/or software modules such as, for example, the assertion service 120. It should be understood that additional and/or alternative devices and/or network nodes can provide the functionality described herein via execution of one or more modules, applications, and/or other software including, but not limited to, the assertion service 120. Thus, the illustrated embodiment of the method 300 should be understood as being illustrative of one contemplated embodiment, and should not be viewed as being limiting in any way.

The method 300 begins at operation 302, wherein the server computer 118 can receive a request for the asserted media 114. The request for the asserted media 114 can be received from almost any entity such as a product manufacturer, a retailer, an employer, an employee, a private entity, a public entity, emergency personnel, an insurance provider, a service provider, medical professionals, and/or almost any other entity. The request for the asserted media 114 also can be received from the user device 102. Thus, the user device 102 can be configured to interact with the assertion service 120 to generate the asserted media 114 instead of, or in addition to, executing the assertion application 108 described herein. Because the request for the asserted media 114 can be received from almost any entity, it should be understood that the above examples are illustrative and should not be construed as being limiting in any way.

From operation 302, the method 300 proceeds to operation 304, wherein the server computer 118 can generate an asserted media ID for identifying the particular instance of asserted media 114 to be generated. The asserted media ID can include almost any type of reference number, identification number, and/or other information. In some embodiments, the asserted media ID can include a unique string such as a globally unique identifier ("GUID"). The asserted media ID can be used to uniquely identify the asserted media 114 for various purposes. For example, the asserted media ID can be embedded in the asserted media 114 and used to track and/or identify the asserted media 114, though this is not necessarily the case. Because the asserted media ID can be omitted in some embodiments, it should be understood that the functionality described herein with respect to operation 304 may be omitted.

From operation 304, the method 300 proceeds to operation 306, wherein the server computer 118 sends a request for asserted media 114 to a device such as, for example, the user device 102. The request for the asserted media 114 can be transmitted to the user device 102 as the data 116 and/or as other types of data or requests. In some embodiments, the server computer 118 can be configured to send one or more instructions to the user device 102, wherein the instructions command or instruct the user device to obtain the media content, the sensor readings, and/or the other information. As can be appreciated from the above description, the request for the asserted media 114 can include instructions for capturing media content and/or an indication of what types of sensor readings and/or other information are to be included in the asserted media 114. The request for the asserted media 114 also can include an asserted media ID and/or other identifying information for inclusion in the asserted media 114 and/or for otherwise identifying the asserted media 114.

From operation 306, the method 300 proceeds to operation 308, wherein the server computer 118 obtains the data 116 from the device such as the user device 102. The data 116 received in operation 308 can include, but is not limited to, media content captured by the user device 102, sensor readings obtained at the user device 102, and/or other information obtained by the user device 102. As such, the data 116 obtained in operation 308 can include the data used to generate the asserted media 114.

From operation 308, the method 300 proceeds to operation 310, wherein the server computer 118 generates the asserted media 114. In particular, the server computer 118 can be configured to combine, embed, and/or associate the sensor readings and/or other information with the media content to generate the asserted media 114. The server computer 118 can be configured to verify that the data 116 includes the media content, sensor readings, and/or other information requested in operation 306 and negotiate provision of any missing data if needed, though such operations are not separately illustrated in FIG. 3.

From operation 310, the method 300 proceeds to operation 312, wherein the server computer 118 shares the asserted media 114. According to some embodiments, the server computer 118 can be configured to transfer the asserted media 114 to the recipient 122 as an email attachment, as a data file, and/or as another type of data via almost any type of network transfer technology. In some other embodiments, the server computer 118 can be configured to host the asserted media 114 at a portal or website, and can send a notification to the recipient 122 that the asserted media 114 is available. As such, the recipient 122 can access the server computer 118 to obtain the asserted media, in some embodiments. Because the asserted media 114 can be shared with the recipient 122 via almost any type of communication and/or via almost any type of communication protocols, it should be understood that the embodiments illustrated and described herein are illustrative, and should not be construed as being limiting in any way. From operation 312, the method 300 proceeds to operation 314. The method 300 ends at operation 314.

Figure 4A:
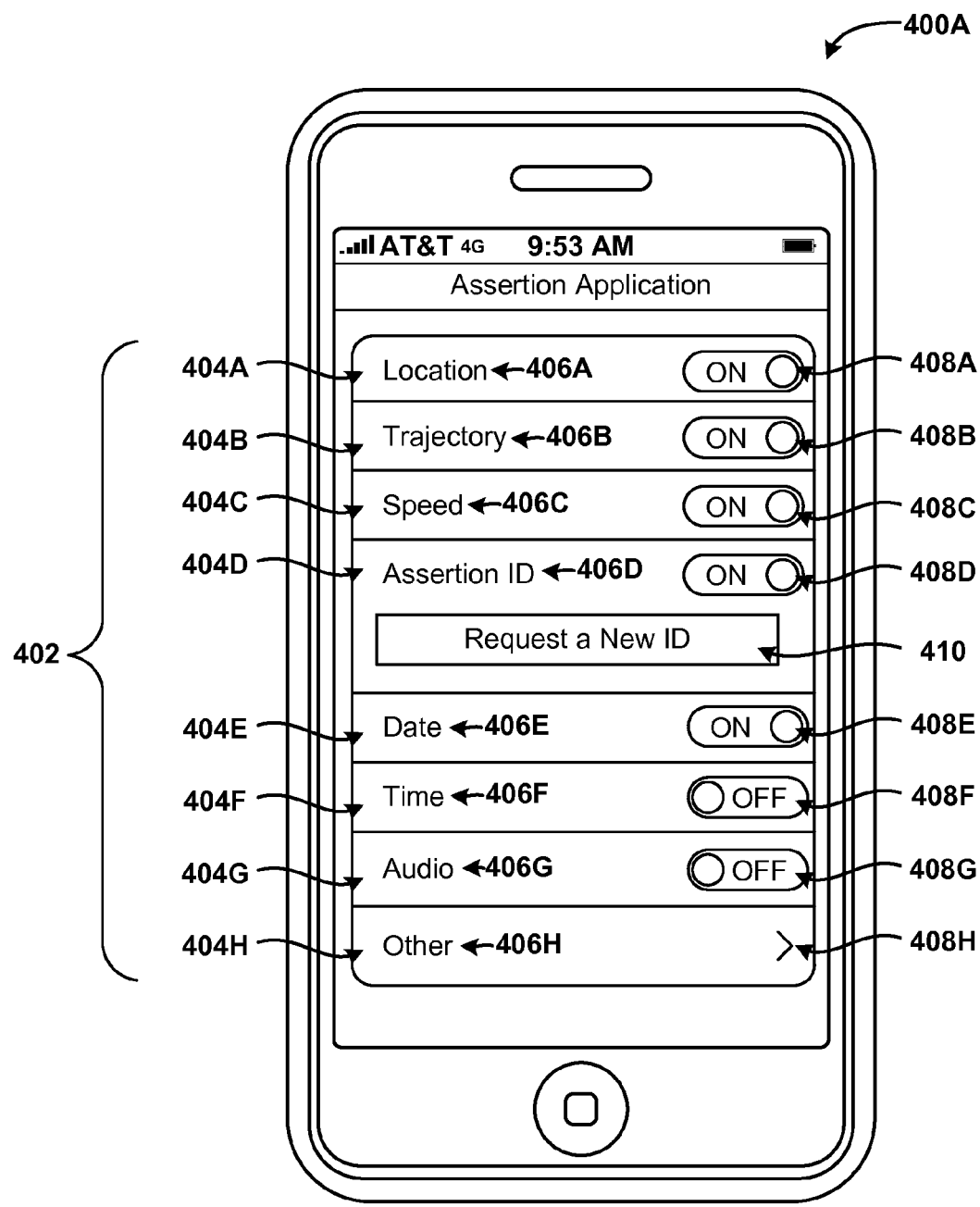
FIGS. 4A-4D are user interface UI diagrams showing aspects of UIs for sharing asserted media, according to some illustrative embodiments.

Turning now to FIGS. 4A-4D, UI diagrams showing various aspects of the concepts and technologies disclosed herein for sharing asserted media will be described according to various illustrative embodiments. FIG. 4A shows an illustrative screen display 400A generated by a device such as the user device 102, for example, by execution of the assertion application 108 described herein. It should be appreciated that the UI diagram illustrated in FIG. 4A is illustrative of one contemplated embodiment, and therefore should not be construed as being limited in any way.

Although not shown in FIG. 4A, the screen display 400A can include various menus and/or menu options. The screen display 400A also can include an assertion application control list 402. The assertion application control list 402 can include a number of rows 404A-H (hereinafter collectively and/or generically referred to as "rows 404"). The rows 404 can correspond to various sensors and/or various types of information that can be used to supplement media content when generating the asserted media 114 as described above. The rows 404 shown in FIG. 4A illustrate only some contemplated examples of sensors and/or information and should not be construed as being limiting in any way.

Each of the rows 404 can include an indication 406A-H (hereinafter collectively and/or generically referred to as "indications 406") of a sensor reading and/or other type of information to which the row 404 corresponds. The rows 404 also can include one or more UI controls 408A-H (hereinafter collectively and/or generically referred to as "UI controls 408"). The UI controls 408 can be used to select and/or deselect inclusion or exclusion of the various sensor readings and/or other information to which the row 404 corresponds in the asserted media 114, and/or to access additional options or menus associated with the row 404. The UI control 408H, for example, can be used to access a submenu or other display for adjusting other types of information that may be included in the asserted media 114 as described herein. The screen display 400A also is illustrated as including a UI control 410 for requesting a new ID. This UI control 410 can be used, for example, for requesting or changing an asserted media ID as described above. In particular, selection of the UI control 410 can prompt the user device 102 to communicate with the assertion service 120 to obtain an asserted media ID generated by the server computer 118 as explained above with reference to operation 304 of FIG. 3. It should be understood that this embodiment is illustrative, and should not be construed as being limiting in any way.

It can be appreciated with reference to FIG. 4A that a user or other entity can tailor, via interactions with the screen display 400A, what sensor readings and/or other information are to be included in the asserted media 114. In the example shown in FIG. 4A, a user has selected to enable or turn on rows 404A-E. As such, asserted media 114 created by the user device 102 can include location information, trajectory information, speed information, an assertion ID, and date information. It should be understood that this embodiment is illustrative, and should not be construed as being limiting in any way.

Figure 4B:
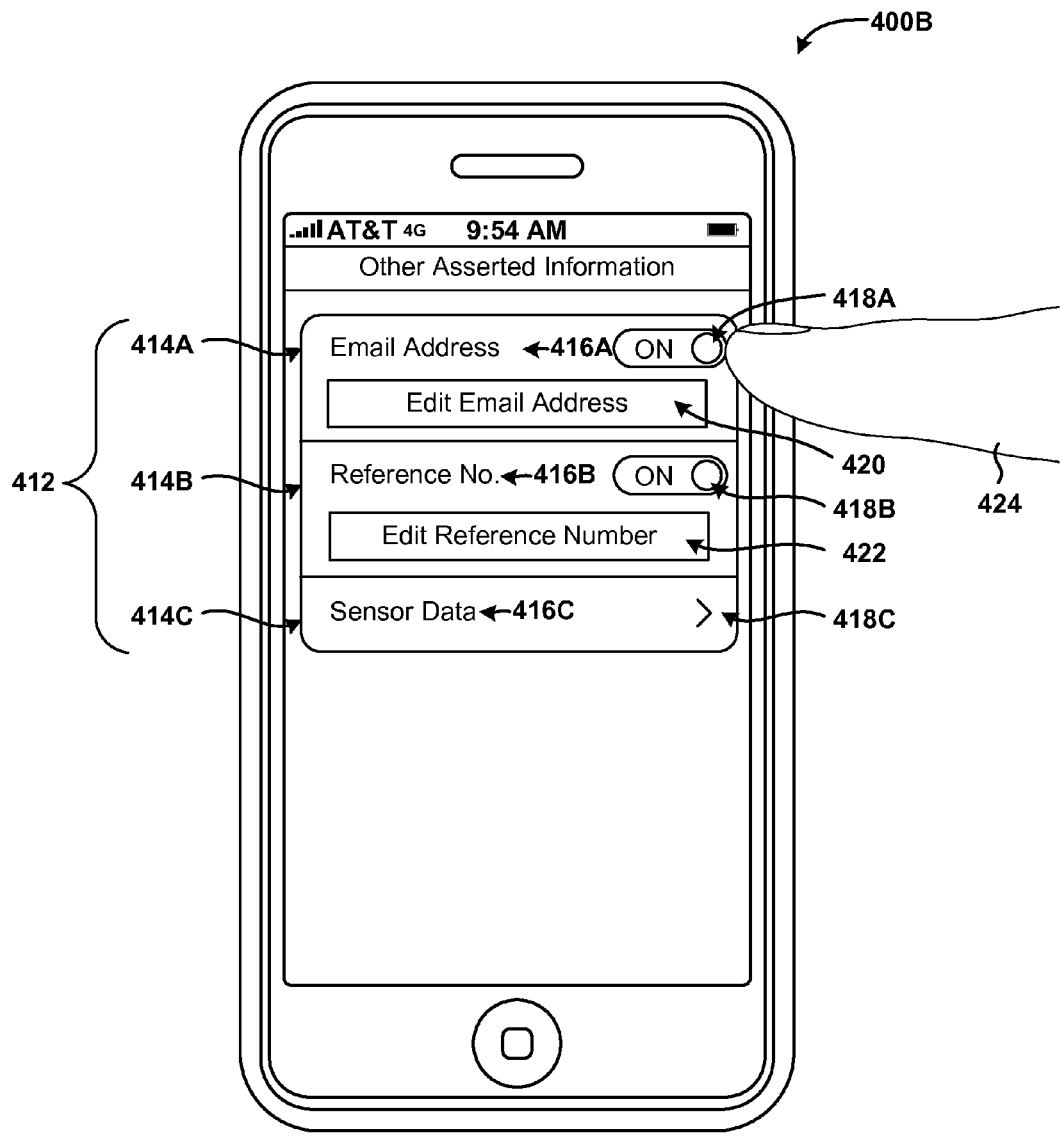

Referring now to FIG. 4B, a UI diagram showing additional aspects of the concepts and technologies disclosed herein for sharing asserted media are described in detail. In particular, FIG. 4B shows a screen display 400B generated by a device such as the user device 102. In some embodiments, the screen display 400B can be generated by the user device 102 in response to detecting a tap, touch, gesture, keystroke, voice command, or other input for activating the UI control 406H shown in FIG. 4A. Because the screen display 400B can be presented in response to other actions, and because the illustrated assertion application control list 402, the rows 404, and/or the UI controls 408 are merely illustrative of one contemplated embodiment, it should be understood that this embodiment is illustrative, and should not be construed as being limiting in any way.

The screen display 400B is illustrated as including a submenu for setting and/or controlling settings for other information to be included in the asserted media 114. In FIG. 4B, the submenu is illustrated as a list of settings for the other information ("other asserted information list") 412. The other asserted information list 412 can be used to allow users to control additional types of sensor readings and/or other information to be included in the asserted media 114. Because the "other" illustrated in FIG. 4A is merely illustrative of one application for which tiered access can be configured, it should be understood that the other asserted information list 412 and the contents thereof are merely illustrative and should not be construed as being limiting in any way.

The other asserted information list 412 includes one or more rows 414A-C (hereinafter collectively and/or generically referred to as "rows 414"). The rows 414 can correspond to one or more particular types or instances of information that can be controlled by a user or other entity. The rows 414 can include indicators 416A-C for indicating a particular type of information that may be included in (or excluded from) the asserted media 114. Because the rows 414 and the contents thereof are illustrative of only one contemplated embodiment, it should be understood that this embodiment is illustrative, and should not be construed as being limiting in any way.

The rows 414 also can include UI controls 418A-C (hereinafter collectively and/or generically referred to as "UI controls 418"). The UI controls 418 can be used to select and/or deselect inclusion and/or exclusion of the information indicated by the indicators 416 in the asserted media 114. While only single UI controls 418 are shown in the screen display 400B for each of the rows 414, it should be understood that multiple UI controls 418 corresponding to multiple preferences, settings, and/or configurations can be presented. As such, it should be understood that this embodiment is illustrative, and should not be construed as being limiting in any way.

The other asserted information list 412 also can include a UI control 420 for editing an email address to be included in the asserted media 114. In some embodiments, the email address of the user can be displayed in the other asserted information list 412, though not shown in FIG. 4B. Additionally, the other asserted information list 412 can include a UI control 422 for displaying and/or editing a reference number to be included in the asserted media 114. In some embodiments, a user may receive and/or may request a reference number from a recipient 122 and/or another entity, as explained above. As such, the user may insert the reference number and/or edit a reference number via selection of the UI control 422, if desired. As shown in FIG. 4B, the screen display 400B also can present a row 414C for accessing and/or selecting sensor data to be included in the asserted media. Selection of the UI control 418C can cause the user device 102 to present another submenu or other UI for controlling sensor data to be included in the asserted media 114, if desired. It should be understood that this embodiment is illustrative, and should not be construed as being limiting in any way.

As shown in FIG. 4B, a user or other entity can select, deselect, and/or configure various aspects of various types of information that can be included in the asserted media 114. The user or other entity can control and/or configure the various types of information by way of interacting with of the UI controls 418 via touch gestures made with a finger 424. Because other input mechanisms are possible and are contemplated, it should be understood that this embodiment is illustrative and should not be construed as being limiting in any way. As explained above, the user can specify, by way of the screen display 400B, whether the various types of information shown in FIG. 4B are or are not to be included in the asserted media 114. These settings indicated by way of interacting with the screen display 400B can be saved by the user device 102, if desired.

Figure 4C:
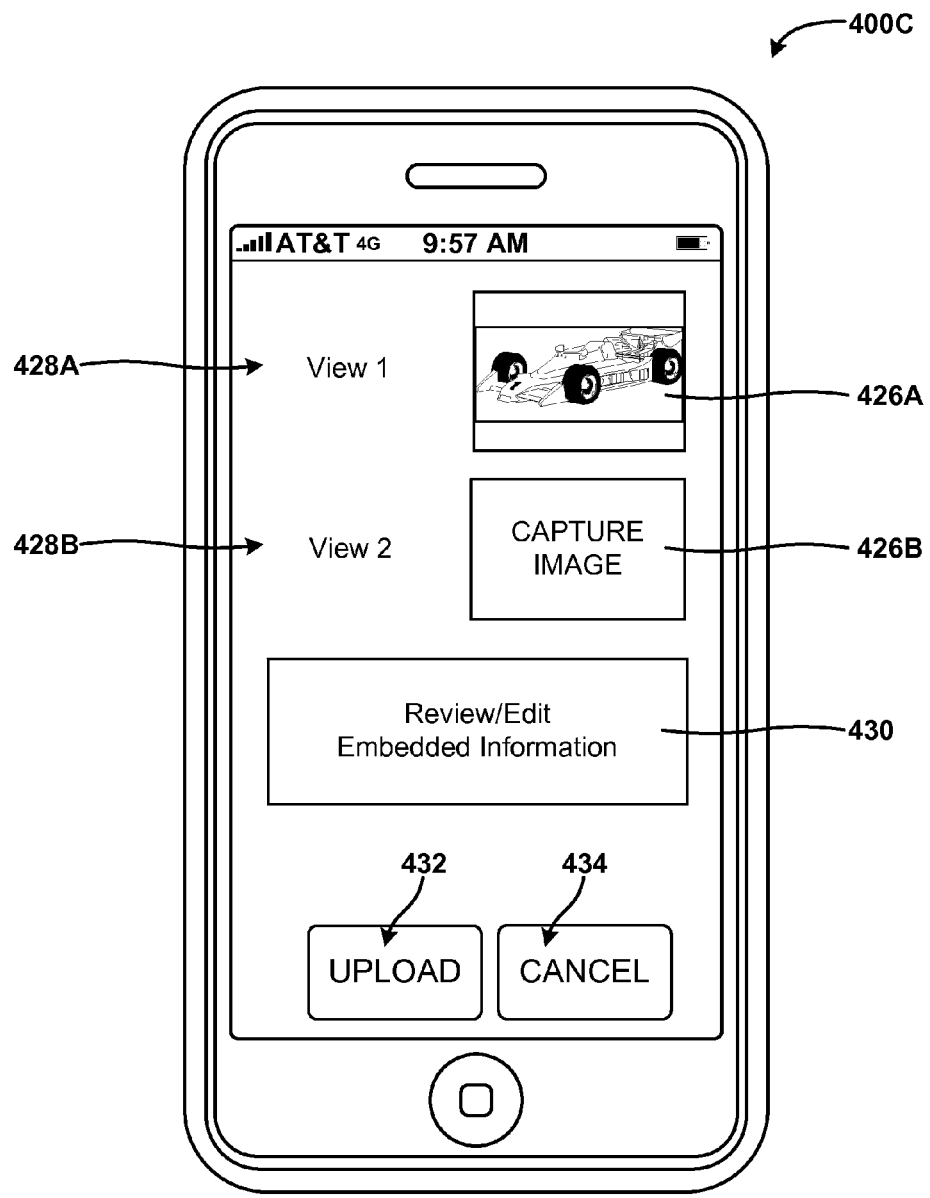

In FIG. 4C, additional aspects of the concepts and technologies disclosed herein for sharing asserted media are illustrated, according to an illustrative embodiment. FIG. 4C shows an illustrative screen display 400C generated by a device such as the user device 102, for example, by execution of the assertion application 108 described herein. It should be appreciated that the UI diagram illustrated in FIG. 4C is illustrative of one contemplated embodiment, and therefore should not be construed as being limited in any way.

In FIG. 4C, the user device 102 is illustrated as providing functionality for capturing media and creating the asserted media 114. As shown in FIG. 4C, the screen display 400C can include one or more image display regions 426A-B (hereinafter collectively and/or generically referred to as "image display regions 426"). As shown in FIG. 4C, a first image display region 426A can include a photograph while a second image display region 426B can correspond to a UI control for capturing an additional photograph, for example. It should be understood that additional image display regions 426 can be displayed and that instructions for capturing images also can be displayed, if desired.

In the illustrated embodiment, a user may be required to submit multiple views of a particular photographed device, structure, or place, to verify ownership or possession of the device or structure and/or presence at a particular place. In some contemplated embodiments, a user is instructed to write a reference numeral on a piece of paper or other item and to include the paper or other item in one or more photographs to prove ownership and/or possession of the photographed item and/or to prove that the user took the photograph of the item. It should be understood that these embodiments are illustrative, and should not be construed as being limiting in any way.

The image display regions 426 can have corresponding view description labels 428A-B (hereinafter collectively and/or generically referred to as "view description labels 428"). The view description labels 428 can describe the image or view depicted in the media represented by the image display regions 426. Again, it should be understood that the media captured at the user device 102 can include video, one or more photographs, and/or one or more audio files.

The screen display 400C also can display a UI control 430 for viewing and/or editing embedded information. It should be understood that selection of the UI control 430 can cause the user device 102 to display a menu, screen, or other functionality for viewing and/or editing information to be embedded in the media to create the asserted media 114. The screen display 400C also can include a UI control 432 for uploading the asserted media 114 and/or a UI control 434 for cancelling the capturing, creating, and/or uploading of the asserted media 114. Selection of the UI control 432 can cause the user device 102 to create the asserted media 114 and upload or otherwise transfer the asserted media 114 to a recipient 122 and/or an assertion service 120. Selection of the UI control 432 also can cause the user device 102 to transmit the media content, sensor readings, and/or other information to the assertion service 120 for generation of the asserted media 114.

Figure 4D:
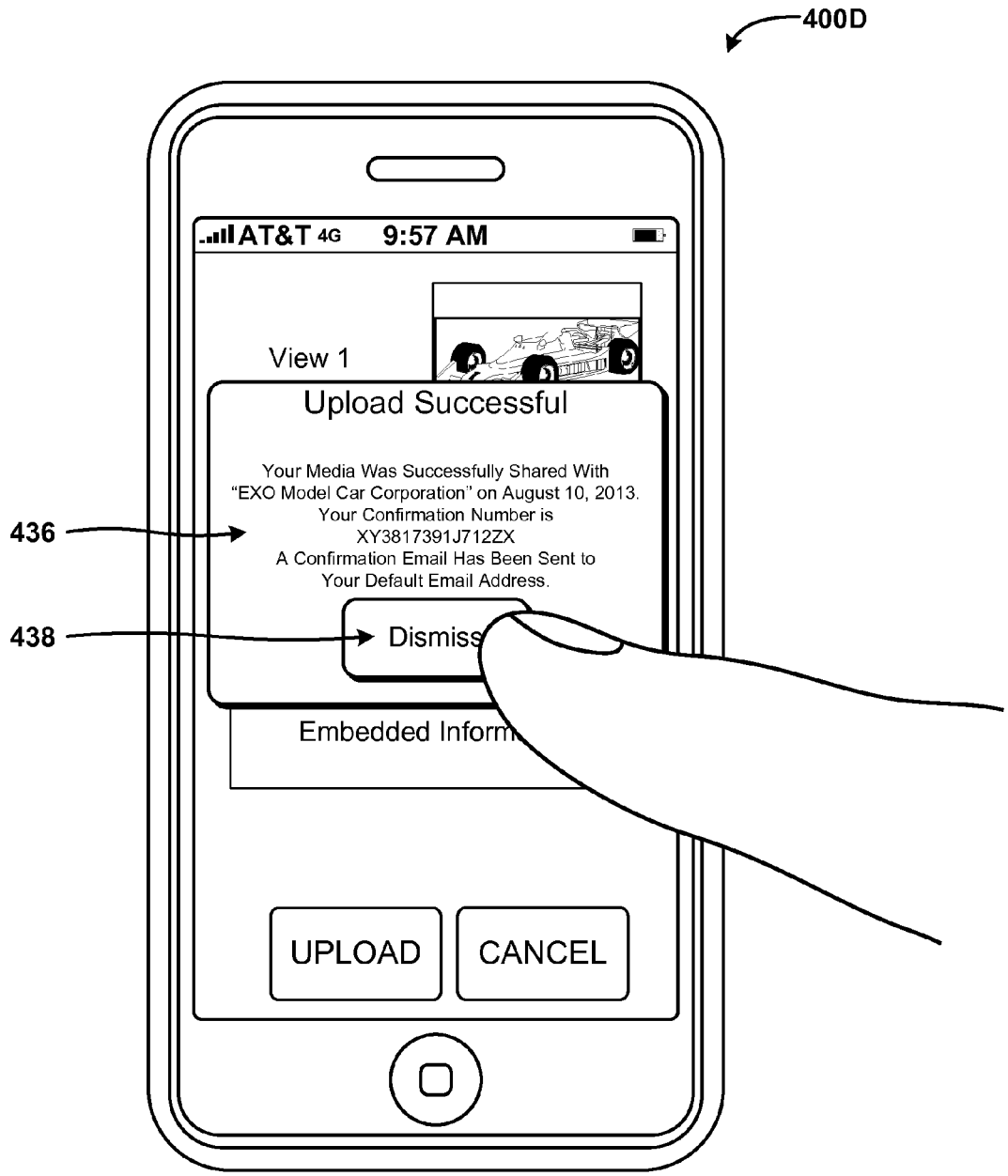

Turning now to FIG. 4D, a UI diagram showing additional aspects of the concepts and technologies disclosed herein for sharing asserted media 114 are described in detail. In particular, FIG. 4D shows a screen display 400D generated by a device such as the user device 102. The screen display 400D can be, but is not necessarily, displayed by the user device 102 in response to a user selecting the UI control 432 illustrated and described above with reference to FIG. 4C and/or in response to other input such as gestures, taps, voice commands, or the like. Because the screen display 400D can be displayed at other times, it should be understood that this embodiment is illustrative, and should not be construed as being limiting in any way.

In FIG. 4D, the user device 102 is illustrated as displaying an asserted media upload indicator 436. The asserted media upload indicator 436 can be provided to inform a user of the user device 102 that the asserted media 114 has been created and uploaded, submitted, and/or otherwise shared with a recipient 122. Additionally, or alternatively, the asserted media upload indicator 436 can be provided to inform a user of the user device 102 that the media content, sensor readings, and/or other information have been submitted to another device for generation of the asserted media 114.

In the illustrated embodiment, the asserted media upload indicator 436 is configured to present additional information such as a recipient of the asserted media 114, a date the asserted media 114 was successfully shared, a confirmation number, and/or other information. Additionally, the asserted media upload indicator 436 can include a UI control 438 for dismissing the asserted media upload indicator 436 and/or other controls for taking other actions with respect to the asserted media upload indicator 436. Because additional and/or alternative information and or UI controls may be displayed in the asserted media upload indicator 436, it should be understood that these embodiments are illustrative, and should not be construed as being limiting in any way.

Figure 5:
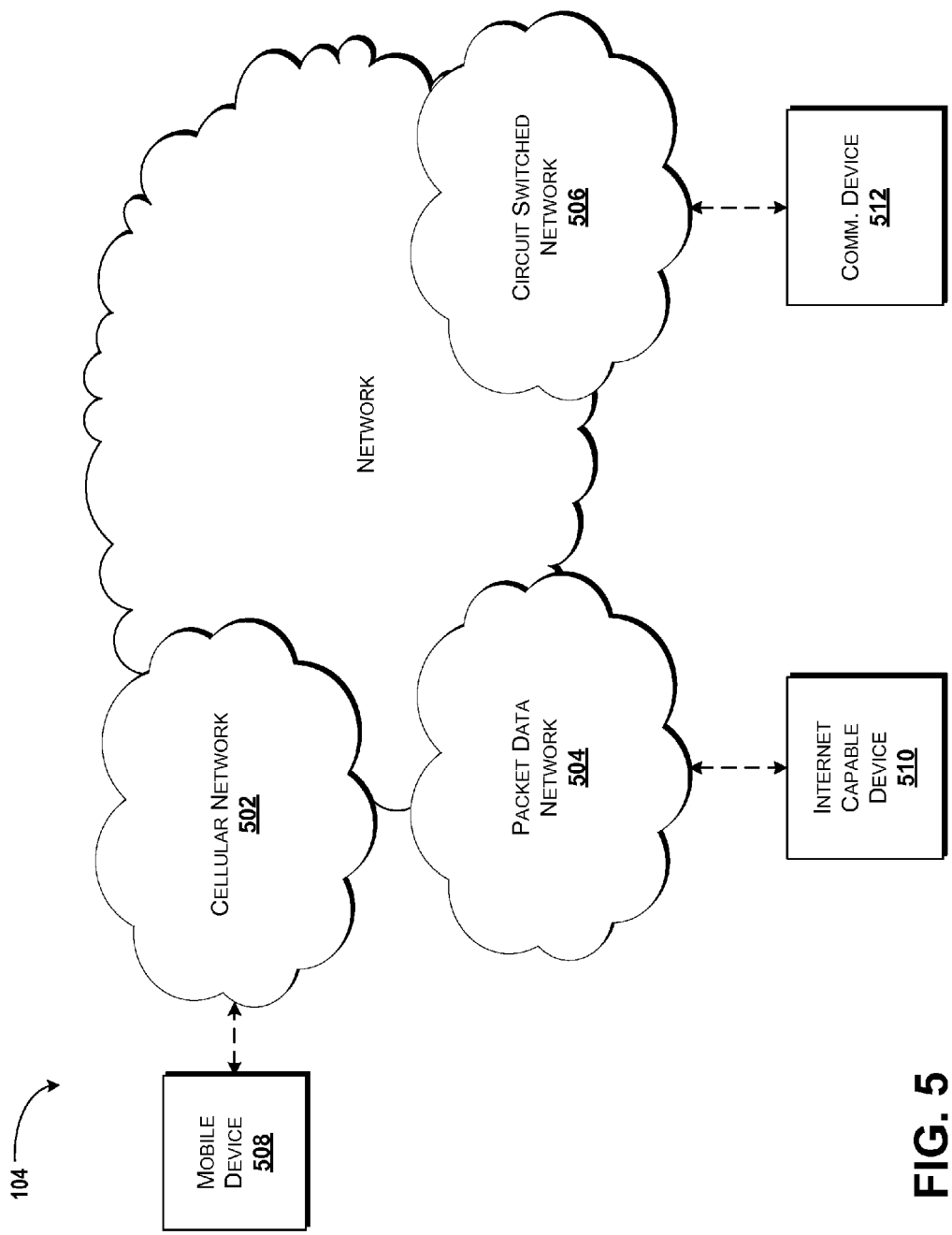
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MME5"), short message service centers ("SMSCs"), multimedia messaging service centers ("MMSCs"), home location registers ("HLR5"), home subscriber servers ("HSSs"), visitor location registers ("VLR5"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

According to various implementations, the user device 102 can include and/or can use any combination of the devices disclosed herein including, but not limited to, the mobile communications device 508, the Internet-capable device 510, and/or the communications device 512 to access web pages or other resources, to access the server computer 118, to transmit and/or receive the data 116 and/or for other interactions between the user device 102, the server computer 118, and/or other entities (not illustrated). As such, it should be understood that the user device 102 can interact with the server computer 118 and/or other devices, networks, services, or nodes via any number and/or combination of devices and networks.

Figure 6:
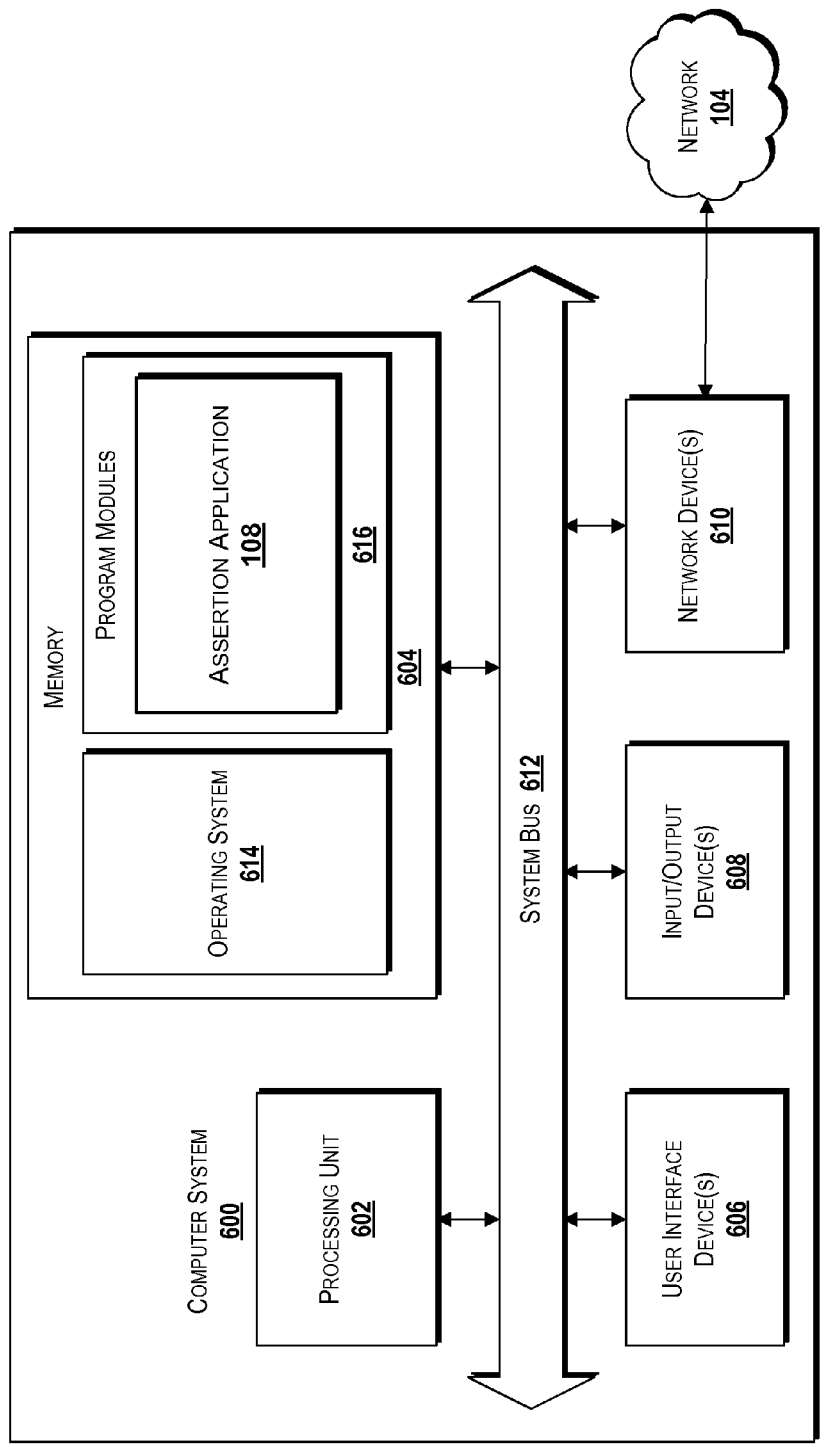
FIG. 6 is a block diagram illustrating an example computer system configured to provide sharing asserted media, according to some illustrative embodiments.

FIG. 6 is a block diagram illustrating a computer system 600 configured to provide the functionality described herein for sharing asserted media, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE CORPORATION, the FREEBSD family of operating systems, the SOLARIS family of operating systems from ORACLE CORPORATION, the ANDROID family of operating systems from GOOGLE INCORPORATED, other operating systems, and the like. Additionally, or alternatively, the operating system 614 can include open source operating systems such as, for example, the TIZEN and/or BOOT2GECKO operating systems, or other proprietary operating systems. Because other operating systems can be included, the above examples should be understood as being illustrative and should not be construed as being limiting in any way.

The program modules 616 may include various software and/or program modules described herein. In some embodiments, for example, the program modules 616 include the application programs, the assertion application 108, and/or other applications or software described herein. These and/or other programs can be embodied in computer-readable media containing instructions that, when executed by the processing unit 602, perform one or more of the methods 200, 300 described in detail above with respect to FIGS. 2-3. According to embodiments, the program modules 616 may be embodied in hardware, software, firmware, or any combination thereof. Although not shown in FIG. 6, it should be understood that the memory 604 also can be configured to store the asserted media 114, the data 116, the assertion service 120, media content, sensor readings, other information, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof, does not include waves, signals, and/or other transitory and/or intangible communication media, per se.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for sharing asserted media have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A method comprising:
   receiving, from a recipient and at a server computer that executes an assertion service, a request for asserted media, wherein the request is generated by the recipient, and wherein the request comprises an asserted media identifier;
   sending, by the server computer and directed to a user device, an instruction that instructs the user device to obtain a sensor reading from sensors of the user device and to capture media content using a media capture device of the user device, wherein the instruction is sent with the asserted media identifier;
   obtaining, at the server computer and from the user device, the sensor reading, the asserted media identifier, and the media content;
   generating, by the server computer, the asserted media comprising the sensor reading and the media content; and
   sharing, by the server computer, the asserted media with the recipient, wherein the sensor reading of the asserted media is usable by the recipient to authenticate the media content of the asserted media.

2. The method of claim 1, wherein the sensors comprise a sound sensor, and wherein sound captured by the sound sensor is used to authenticate the media content.

3. The method of claim 1, wherein sharing the asserted media with the recipient comprises:
   hosting the asserted media at a website; and
   sending, to the recipient, a notification that the asserted media is available.

4. The method of claim 1, further comprising:
   receiving, with the sensor reading and the media content, location information that identifies a location of the user device when the media content and the sensor reading were captured by the user device; and
   generating the asserted media with the location information.

5. The method of claim 1, further comprising:
   receiving, with the sensor reading and the media content, an international mobile equipment identity of the user device; and generating the asserted media with the international mobile equipment identity.

6. The method of claim 1, further comprising:
   receiving, with the sensor reading and the media content, an international mobile subscriber identity of a user of the user device; and
   generating the asserted media with the international mobile subscriber identity.

7. The method of claim 1, further comprising:
   receiving, with the sensor reading and the media content, an account number associated with a user of the user device; and
   generating the asserted media with the account number.

8. The method of claim 1, wherein the recipient of the asserted media comprises a product manufacturer, wherein the user device is associated with a customer of the product manufacturer, wherein the asserted media relates to a product that is purchased by the customer, and wherein the product is manufactured by the product manufacturer.

9. The method of claim 1, wherein the asserted media identifier is generated by the recipient.

10. A device comprising
    a processor; and
    a memory that stores computer-executable instructions that, when executed by the processor, cause the processor to perform operations comprising:
    receiving, from a recipient, a request for asserted media, wherein the request is generated by the recipient, wherein the request comprises an asserted media identifier,
    sending, directed to a user device, an instruction that instructs the user device to obtain a sensor reading from sensors of the user device and to capture media content using a media capture device of the user device, and wherein the instruction is sent with the asserted media identifier,
    obtaining, from the user device, the sensor reading, the asserted media identifier, and the media content,
    generating the asserted media comprising the sensor reading and the media content, and
    sharing the asserted media with the recipient, wherein the sensor reading of the asserted media is usable by the recipient to validate or refute the media content of the asserted media.

11. The device of claim 10, wherein the computer-executable instructions, when executed by the processor, cause the processor to perform operations further comprising:
    receiving, with the sensor reading and the media content, an international mobile equipment identity of the user device; and generating the asserted media with the international mobile equipment identity.

12. The device of claim 10, wherein the computer-executable instructions, when executed by the processor, cause the processor to perform operations further comprising:
    receiving, with the sensor reading and the media content, an international mobile subscriber identity of a user of the user device; and
    generating the asserted media with the international mobile subscriber identity.

13. The device of claim 10, wherein the computer-executable instructions, when executed by the processor, cause the processor to perform operations further comprising:
    receiving, with the sensor reading and the media content, an account number associated with a user of the user device; and
    generating the asserted media with the account number.

14. The device of claim 10, wherein the asserted media identifier is generated by the recipient.

15. A computer storage medium that stores computer-executable instructions that, when executed by a processor, cause the processor to perform operations comprising:

receiving, from a recipient, a request for asserted media, wherein the request comprises an asserted media identifier;

sending, directed to a user device, an instruction that instructs the user device to obtain a sensor reading from sensors of the user device and to capture media content using a media capture device of the user device, wherein the instruction is sent with the asserted media identifier;

obtaining, from the user device, the sensor reading, the asserted media identifier, and the media content;

generating the asserted media comprising the sensor reading and the media content; and sharing the asserted media with the recipient, wherein the sensor reading of the asserted media is usable by the recipient to validate or refute the media content of the asserted media.

16. The computer storage medium of claim 15, wherein the computer-executable instructions, when executed by the processor, cause the processor to perform operations further comprising:

receiving, with the sensor reading and the media content, an international mobile equipment identity of the user device; and generating the asserted media with the international mobile equipment identity.

17. The computer storage medium of claim 16, wherein the computer-executable instructions, when executed by the processor, cause the processor to perform operations further comprising: receiving, with the sensor reading and the media content, an international mobile subscriber identity of a user of the user device; and generating the asserted media with the international mobile subscriber identity.

18. The computer storage medium of claim 15, wherein the computer-executable instructions, when executed by the processor, cause the processor to perform operations further comprising: receiving, with the sensor reading and the media content, an account number associated with a user of the user device; and generating the asserted media with the account number.

19. The computer storage medium of claim 15, wherein the computer-executable instructions, when executed by the processor, cause the processor to perform operations further comprising:

receiving, with the sensor reading and the media content, location information that identifies a location of the user device when the media content and the sensor reading were captured by the user device; and generating the asserted media with the location information.

20. The computer storage medium of claim 15, wherein the asserted media identifier is generated by the recipient.

* * * * *